United States Patent [19]

Siemann et al.

[11] Patent Number: 4,647,026
[45] Date of Patent: Mar. 3, 1987

[54] PNEUMATIC OR HYDROPNEUMATIC TENSION SPRING

[75] Inventors: Martin Siemann, Bad Breisig; Wolfgang Luhn, Nievern, both of Fed. Rep. of Germany

[73] Assignee: Stabilus GmbH, Koblenz-Neuendorf, Fed. Rep. of Germany

[21] Appl. No.: 772,655

[22] Filed: Sep. 4, 1985

[30] Foreign Application Priority Data

Sep. 5, 1984 [DE] Fed. Rep. of Germany ....... 3432606

[51] Int. Cl.$^4$ .............................. F16F 9/34; F16F 9/36
[52] U.S. Cl. .................... 267/64.15; 188/281;
188/315; 188/322.13; 188/322.17
[58] Field of Search ................... 267/64.14, 64.15, 120,
267/64.16, 64.17, 64.18, 64.19, 64.21, 64.22,
64.23, 64.24, 64.25, 64.26, 64.27, 64.28;
188/281, 282, 301, 315, 322.13, 322.14, 322.15,
322.16, 322.17; 16/52, 66, 84

[56] References Cited

U.S. PATENT DOCUMENTS 3,326,546  6/1967  Otto ................................. 267/64.15
4,113,071  9/1978  Müller et al. ...................... 188/282
4,156,523  5/1979  Bauer ................................ 267/120
4,287,970  9/1981  Eusemann et al. ............. 188/315 X

FOREIGN PATENT DOCUMENTS 554983   7/1943  United Kingdom ............ 267/64.15
1125104  8/1968  United Kingdom ............ 267/64.15
1241337  8/1971  United Kingdom ............ 267/64.15

Primary Examiner—Douglas C. Butler
Assistant Examiner—Richard R. Diefendorf
Attorney, Agent, or Firm—Brumbaugh, Graves, Donohue & Raymond

[57] ABSTRACT

In a pneumatic or hydropneumatic tension spring which consists of a container in which a cylinder is concentrically arranged and a liquid and/or gas filling under pressure has an inward force upon a piston rod, between a working chamber on the piston rod side and an annular chamber a damper device is arranged which generates a greater damping effect in the inward movement of the piston rod than in the outward movement of the piston rod. Due to this measure a damped inward movement of the piston rod is achieved while the extraction of the piston rod can be effected without appreciable damping.

9 Claims, 5 Drawing Figures

PNEUMATIC OR HYDROPNEUMATIC TENSION SPRING

BACKGROUND OF THE INVENTION

Pneumatic and hydropneumatic springs are in common use. Springs in which the piston rod is biased towards an outermost position are used e.g. as balancing means for trunk lids of motor vehicles. On the other hand, there is also sometimes need for pneumatic and hydropneumatic "tension springs" in which the piston rod is biased by the pressurized gas towards an innermost position. Such gas springs are useful e.g. in cases in which an object is suspended and is to be adjusted to different levels.

STATEMENT OF THE PRIOR ART

A hydropneumatic tension spring, in which the piston rod is retracted in the unloaded condition, has become known from U.S. Pat. No. 3,326,546. In this case the working chamber of the cylinder on the piston rod side is in communication through constantly opened passages with the annular chamber formed by cylinder and container, so that the damping action is equally great in both directions of movement of the piston rod, that is in the driving into the cylinder and in the extraction from the cylinder.

OBJECT OF THE INVENTION

It is an object of the present invention to produce a pneumatic or hydropneumatic tension spring which does not drive at high speed into the retracted end position and on the other hand can be drawn out without unnecessary expenditure of force. The tension spring is at the same time to be simple in assembly and to display high operational reliability.

SUMMARY OF THE INVENTION

A pneumatic or hydropneumatic tension spring comprises a container in which a cylinder is concentrically arranged. Between the container and the cylinder an annular chamber is formed which contains a liquid and/or gas filling under pressure. A piston rod is axially movably guided. Sealing means provide a sealing effect with the piston rod. The piston rod is firmly connected with a piston sliding on the inner wall of the cylinder. This piston divides the interior of the cylinder into two working chambers sealed from one another. The working chamber limited by a container end piece is connected with the atmosphere. The working chamber on the piston rod side is in communication with the annular chamber through a constantly open passage. Between the working chamber on the piston rod side and the annular chamber a damper device is arranged which generates a greater damping effect in the inward movement of the piston rod than in the extraction movement of the piston rod.

Such a damper device dependent upon the direction of movement of the piston rod permits the piston rod to drive at a predetermined speed into the retracted end position, while no damping forces, or at least no appreciable damping forces, oppose the extraction movement of the piston rod. The arrangement of the damper device between the working chamber on the piston rod side and the annular chamber renders simple assembly of the tension spring possible and guarantees high operational reliability.

According to one feature of the invention the damper device comprises, as well as the constantly opened passage, a passage opening closable in the inward movement of the piston rod by a valve disc of annular form. Thus in a very simple manner the object is achieved that the inward movement of the piston rod takes place with a relatively great damping effect, while in the extraction movement the passage opening is cleared by the valve disc and the damping effect is kept so slight as to be unnoticeable.

In one form of embodiment in accordance with the invention the annular valve disc is formed by a ring of rectangular cross-section guided in sealing manner on the piston rod and arranged axially movably between two abutment faces, the passage opening being formed by an annular passage surrounding the piston rod. This ring arranged with slight radial stress on the piston rod closes on inward movement of the piston rod the annular passage, as a result of the friction on the piston rod and the pressure difference between the annular chamber and the working chamber on the piston rod side, so that only the constantly opened passage takes over the inward movement damping of the piston rod. Accordingly the inward speed can be determined merely by appropriate selection of the constantly opened passage cross-section, in a simple manner.

A further variant of embodiment is obtained in accordance with the invention in that the annular valve disc is formed by a sealing ring movable between two abutment faces which closes on inward movement of the piston rod bores arranged in a closure piece on the piston rod side which serve as passage opening. According to one feature here the sealing ring can be connected by frictional engagement with the piston rod. In further development of the invention the sealing ring is subject to the action of a compression spring.

According to one feature the constantly opened passage is formed by at least one bore in the cylinder, arranged close to the closure piece on the piston rod side. Thus a spatial separation of the constantly opened passage from the closable passage opening is achieved. A further form of embodiment provides that according to the invention the constantly opened passage is formed by at least one channel arranged in the sealing ring. According to a further feature of the invention the constantly opened passage is formed by at least one channel bridging over the valve disc and opening into a passage opening.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail below by reference to the examples of embodiment as represented in the drawing, wherein.

DESCRIPTION OF THE PREFERRED EMBODIMENTS

Figure 1:
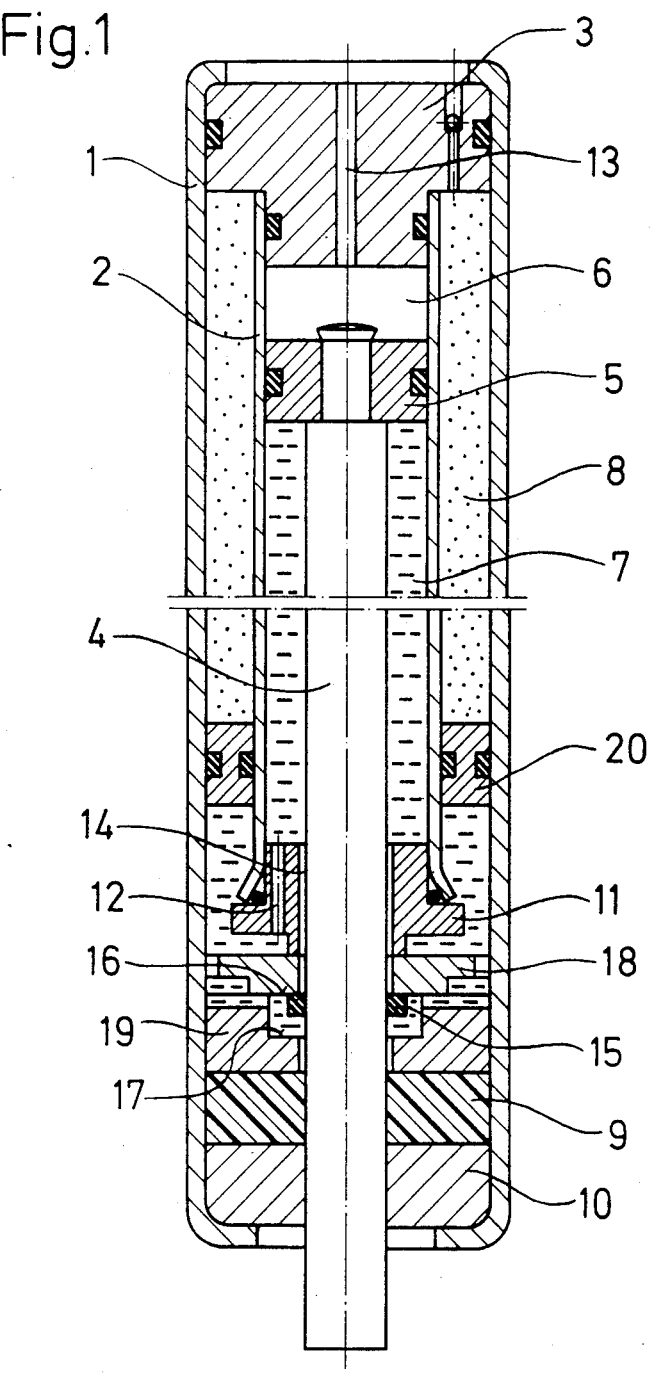
FIG. 1 shows a hydropneumatic tension spring in longitudinal section.

A hydropneumatic tension spring shown in FIG. 1 comprises a container 1 concentrically in which a cylinder 2 is arranged. A container end piece 3 at one end centers the cylinder 2, which carries a closure piece 11 at the other end. The interior space of the cylinder 2 is divided by a piston 5, connected with a piston rod 4, into a working chamber 6 on the end piece side and a working chamber 7 on the piston rod side, which are sealed off from one another by the piston 5. Both a gas filling under pressure and a liquid filling are provided in an annular chamber 8 situated between the cylinder 2 and the container 1, and an annular separator piston 20 separates the gas filling from the liquid filling. In the working chamber 7 too there is a liquid filling which is in communication with chamber 8 through a constantly opened passage 12, here represented as a bore in the closure piece 11. The piston rod 4 is sealed off to the exterior by means of a piston rod seal 9 and is axially movably guided by a piston rod guide 10. In the closure piece 11 there is a central bore which is made larger in diameter than the diameter of the piston rod 4, so that an annular channel 14 forms between the central bore of the closure piece 11 and the outer surface of the piston rod 4. This annular channel 14 continues in a control disc 18 which forms an abutment face 16 for a ring 15 of rectangular cross-section. A second control disc 19 likewise forms an abutment face 17 for the ring 15, and these abutment faces 16 and 17 permit an axial movement of the ring 15. For the ventilation of the working chamber 6 a ventilation passage 13 is provided in the container end piece 3, and connects the working chamber 6 with the atmosphere.

An inward driving force resulting from the difference of piston area and cross-sectional area of the piston rod 4 multiplied by the internal pressure is exerted upon the piston rod 4 by the pressure prevailing in the interior of the spring. In this driving of the piston rod 4 into the container 1 the ring 15 places itself against the abutment face 16 of the control disc 18 and thus closes the annular channel 14. In the case of this direction of movement of the piston rod 4 only the constantly opened constricted passage 12 in the closure piece 11 connects the liquid-filled working chamber 7 on the piston rod side with the liquid filling in the annular chamber 8. The damping effect resulting from the constantly opened passage 12 thus determines the speed of inward movement of the piston rod 4, while no pressure can build up in the working chamber 6 on the container end piece side, since this working chamber 6 is in communication with atmosphere through the ventilation passage 13.

The extraction of the piston rod 4 from the container 1 takes place in that an extraction force is exerted upon the piston rod 4, in which case the ring 15, arranged with slight friction upon the piston rod, places itself against the abutment face 17 of the control disc 19 and thus clears the annular passage 14. In this extraction phase the liquid displaced in the working chamber 7 on the piston rod side is forced by way of the annular passage 14 and the corresponding passage openings into the liquid-filled part of the annular chamber 8, while liquid can likewise flow through the constantly opened passage 12 out of the working chamber 7 into the annular chamber 8. By appropriate selection of the cross-section of the annular passage 14 it is possible to achieve the object that the extraction movement takes place nearly without damping.

Figure 2:
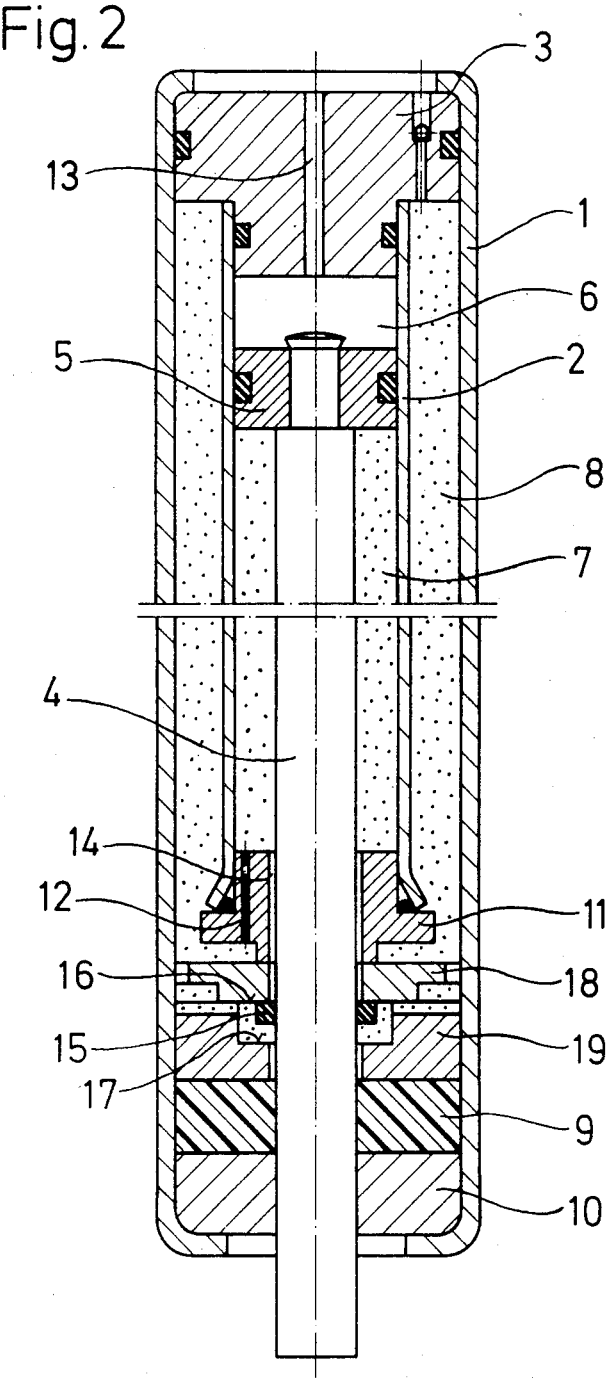
FIG. 2 shows a pneumatic tension spring in longitudinal section.

The pneumatic tension spring as shown in FIG. 2 differs as regards assembly and manner of operation essentially in that here no liquid filling is provided in the working chamber 7 and the annular chamber 8 and accordingly the annular separator piston is eliminated. Accordingly this form of embodiment with gas damping works for the piston rod movement. The utilized reference numerals correspond to those according to FIG. 1.

Figure 3:
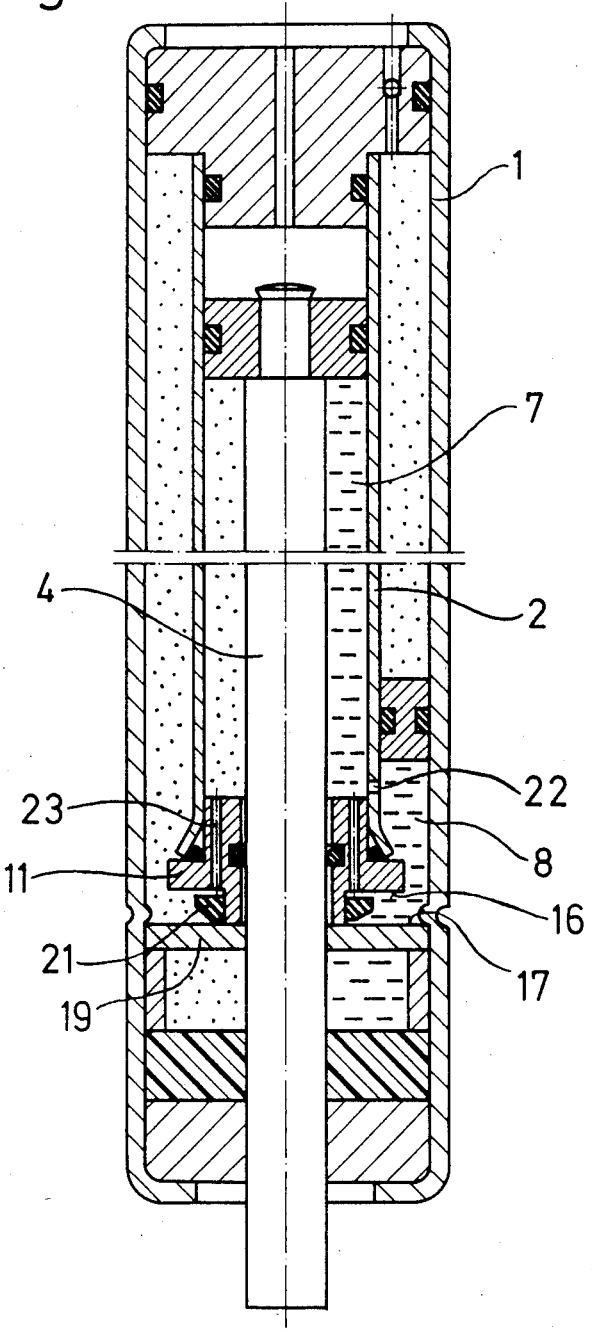
FIG. 3 shows a pneumatic or hydropneumatic tension spring with an annular valve disc, in longitudinal section.

The tension spring as shown in FIG. 3 is shown in the right half as hydropneumatic embodiment and in the left half as pneumatic embodiment. This embodiment differs essentially from that according to FIGS. 1 and 2 in that the damper device comprises as constantly opened passage a bore 22 arranged close to the closure piece 11 in the cylinder 2, while axial bores 23 in the closure piece 11 are closable by a sealing ring 21 which is axially movable between the abutment faces 16 and 17. In the driving of the piston rod 4 into the container 1 the pressure in the working chamber 7 drops, whereby the sealing ring 21 applies itself to the abutment face 16 of the closure piece 11 and thus closes the axial bores 23. The damping medium can flow only by way of the bores 22 out of the annular chamber 8 into the working chamber 7, and the size of the bore 22 is a measure for the speed of inward movement of the piston rod 4.

Figure 4:
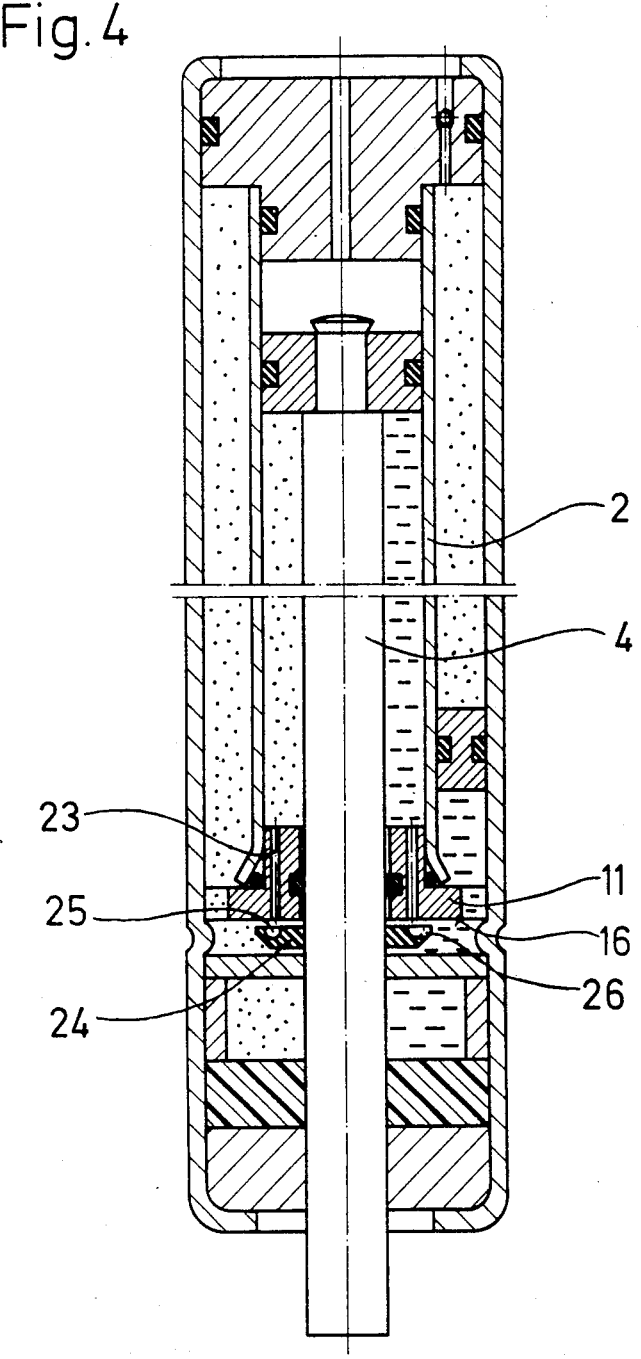
FIG. 4 shows the combination of the constantly opened passage cross-section with a closable passage opening, in a pneumatic or hydropneumatic tension spring.

The form of embodiment according to FIG. 4 is likewise represented in the right half as hydropneumatic and in the left half as pneumatic tenson spring. This embodiment differs from that according to FIG. 3 essentially in that the axial bores 23 provided in the closure piece 11 are covered by a sealing ring 24, arranged with slight friction on the piston rod 4, when the piston rod 4 drives into the cylinder 2. The only connection between the working chamber 7 and the annular chamber 8 is produced due to an annular recess 25 in the sealing ring 24 and the radially outwardly extending outlet opening 26, when the sealing ring 24 abuts on the abutment face 16. Accordingly the passage cross-section formed by the annular recess 25 and the outlet opening 26 determines the damping of the inward movement of the piston rod 4.

Figure 5:
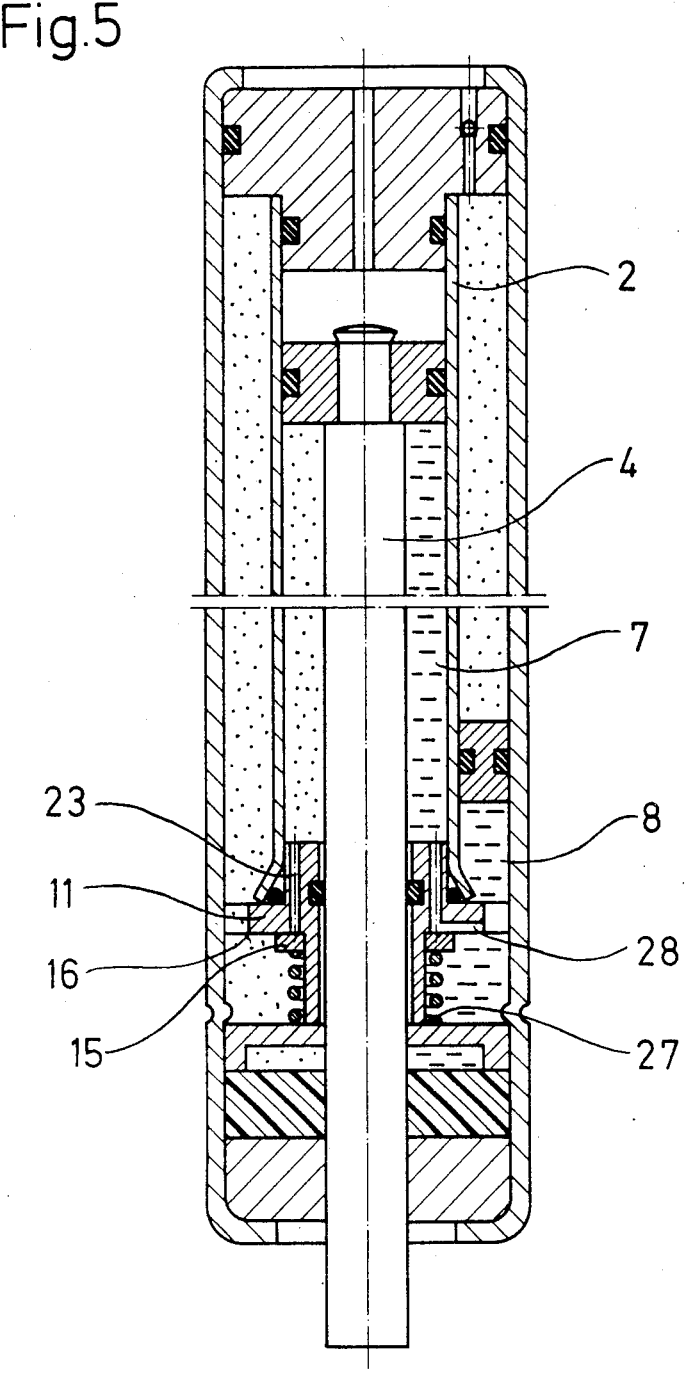
FIG. 5 shows the longitudinal section through a pneumatic or hydropneumatic tension spring with a spring-loaded valve disc and a constantly opened passage bridging over this valve disc.

FIG. 5 again shows a hydropneumatic tension spring in the right half and a pneumatic tension spring in the left half. Axial bores 23 are provided in the closure piece 11, one axial bore being connected with a transverse passage 28. This transverse passage 28 forms a constantly opened cross-section between the working chamber 7 and the annular chamber 8 when the ring 15 is in abutment on the abutment face 16. The ring 15 is pressed against the abutment face 16 by means of a compression spring 27, so that in the driving of the piston rod 4 into the cylinder 2 the damping action of the constantly opened cross-section determines the speed of inward movement. In the extraction of the piston rod 4 the ring 15 is lifted away from the abutment face 16 and the fluid can flow out of the working chamber 7 into the annular chamber 8 without appreciable damping effect.

While specific embodiments of the invention have been shown and described in detail to illustrate the application of the inventive principles, it will be understood that the invention may be embodied otherwise without departing from such principles.

It is to be noted that the reference numbers in the claims are only provided in view of facilitating the understanding of the claims. These reference numbers are by no means to be understood as restrictive.

What is claimed is:

1. A tension spring, comprising: a container; a cylinder concentrically arranged within said container so as to form an annular chamber between said container and said cylinder; a piston rod provided so as to be guided axially movably in an outwardly sealing manner and being firmly connected adjacent an inner end thereof with a piston sliding on the inner wall of said cylinder, said piston dividing the interior of said cylinder into two working chambers sealed from one another, namely a first working chamber on the side of said piston remote from said piston rod and a second working chamber surrounding said piston rod, said first working chamber being limited by a container end piece and being connected with the atmosphere, said second working chamber being in communication with said annular chamber through a constantly open passage; a damper device being arranged between said second working chamber and said annular chamber, said damper device including as well as said constantly open passage a passage opening closable by an annular valve disc on inward movement of said piston rod, said annular chamber and said second working chamber containing a filling fluid under pressure, at least a part of said filling fluid contained within said annular chamber being gaseous, said damper device generating a greater damping effect on inward movement of said piston rod than on outward movement of said piston rod.

2. A tension spring as set forth in claim 1, wherein the annular valve disc is formed by a ring guided in a sealing manner on the piston rod, said ring being arranged axially movable between two abutment faces while said passage opening is formed by an annular channel surrounding the piston rod.

3. A tension spring as set forth in claim 1, wherein said annular valve disc is formed by a sealing ring movable between two abutment faces, which sealing ring on inward movement closes axial bores serving as said passage openings, said axial bores being arranged in a closure piece of said second working chamber.

4. A tension spring as set forth in claim 2 or 3, wherein said annular valve disc is in frictional engagement with said piston rod.

5. A tension spring as set forth in claim 2 or 3, wherein said annular valve disc is biased by the action of a compression spring towards a closing position.

6. A tension spring as set forth in claim 1, wherein said constantly open passage is formed by at least one bore arranged in said cylinder close to a closure piece of said second working chamber.

7. A tension spring as set forth in claim 1, wherein said constantly open passage is formed by at least one recess of said annular valve disc.

8. A tension spring as set forth in claim 1, wherein said constantly open passage is formed by at least one transverse channel in a closure piece of said second working chamber, said transverse channel bridging over said valve disc and joining an axial bore through said closure piece.

9. A tension spring, comprising: a cylinder having an axis and two ends, namely a first end and a second end, and including a cavity axially between said two ends; a container surrounding said cylinder and having a first end adjacent said first end of said cylinder and a second end adjacent said second end of said cylinder; an annular chamber defined radially between said cylinder and said container, said annular chamber being closed adjacent said first end of said container; a piston rod entering into said cavity through a guiding and sealing unit adjacent said second end of said cylinder and said container, respectively; a pison fixed to an inner end of said piston rod within said cavity and sealingly sliding on an inner wall face of said cylinder, said piston dividing said cavity into two working chambers, a first working chamber adjacent said first end of said cylinder and a second working chamber adjacent said second end of said cylinder, said first working chamber being in connection with the atmosphere, said second working chamber being connected with said annular chamber through damping passage means adjacent said second end of said cylinder, said damping passage means including an annular valve disc axially movable in response to axial movement of said piston rod inwardly and outwardly of said cavity, said annular valve disc reducing the cross-sectional area of said damping passage means in response to inward movement of said piston rod and increasing the cross-sectional area of said damping passage means in response to outward movement of said piston rod; and a filling fluid under pressure being provided within said annular chamber and said second working chamber, at least a part of said filling fluid contained within said annular chamber being gaseous.

* * * * *